Jan. 18, 1966
M. STEIN
3,229,893
CONTINUOUS SELF-RETURNED MAILING ENVELOPE
Filed Dec. 9, 1963
5 Sheets-Sheet 1
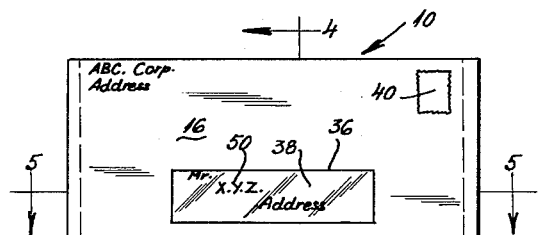
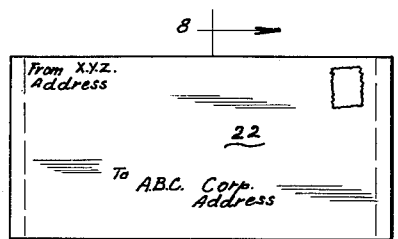
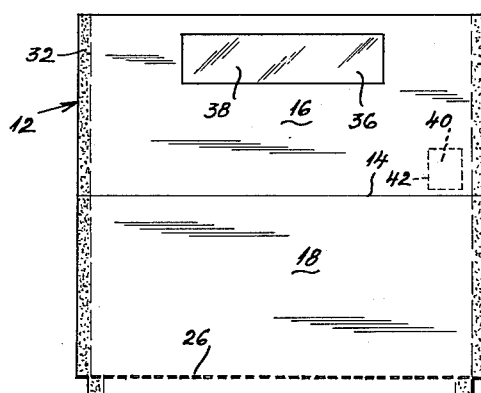
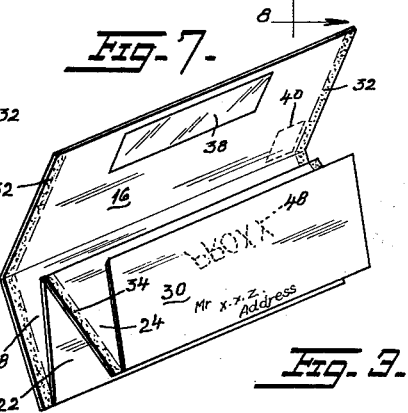
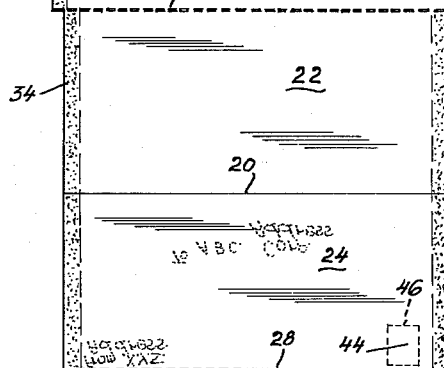
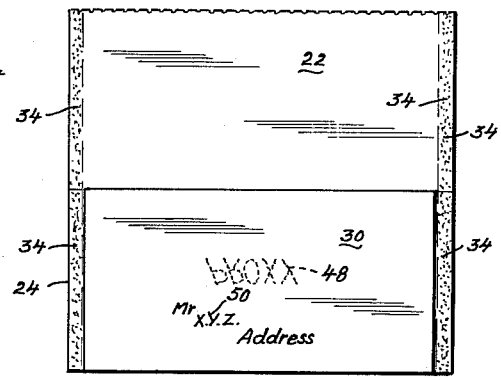
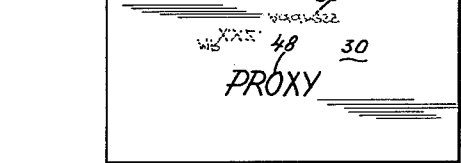
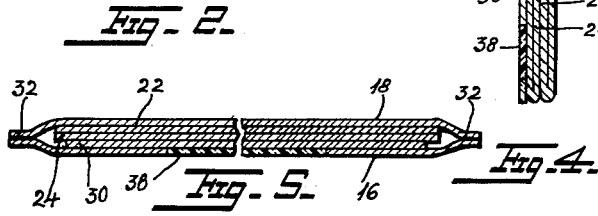
INVENTOR.
Myron Stein
BY Polachek & Saulsbury
ATTORNEYS.

Jan. 18, 1966 M. STEIN 3,229,893
CONTINUOUS SELF-RETURNED MAILING ENVELOPE
Filed Dec. 9, 1963 5 Sheets-Sheet 2
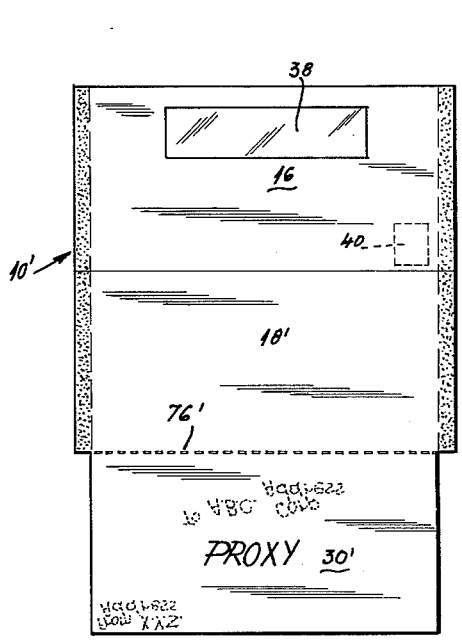
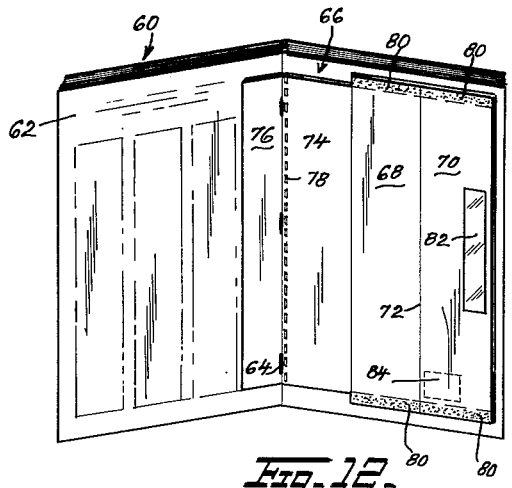
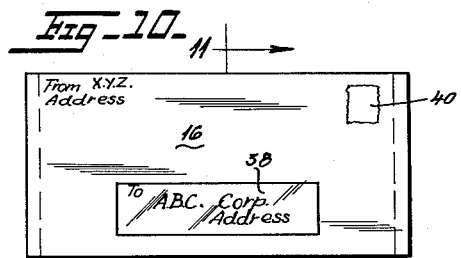
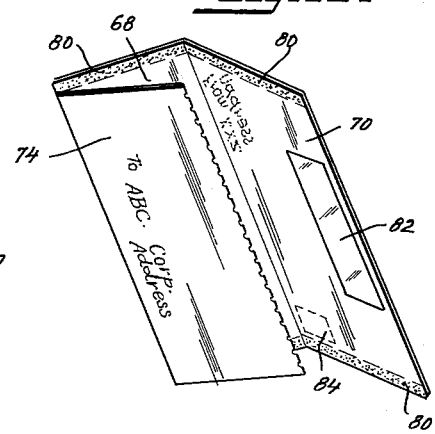
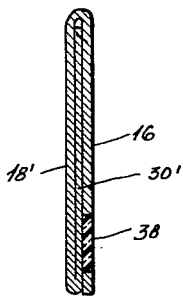
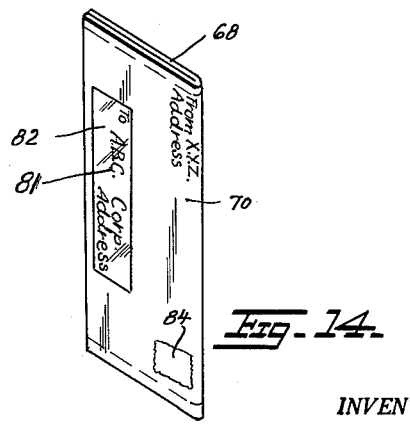
INVENTOR.
Myron Stein
BY Polachek & Saulsbury
ATTORNEYS.

Jan. 18, 1966   M. STEIN   3,229,893
CONTINUOUS SELF-RETURNED MAILING ENVELOPE
Filed Dec. 9, 1963   5 Sheets-Sheet 3

INVENTOR.
Myron Stein
BY
Polachek & Saulsbury
ATTORNEYS.

Jan. 18, 1966    M. STEIN    3,229,893
CONTINUOUS SELF-RETURNED MAILING ENVELOPE
Filed Dec. 9, 1963    5 Sheets-Sheet 4

INVENTOR.
Myron Stein

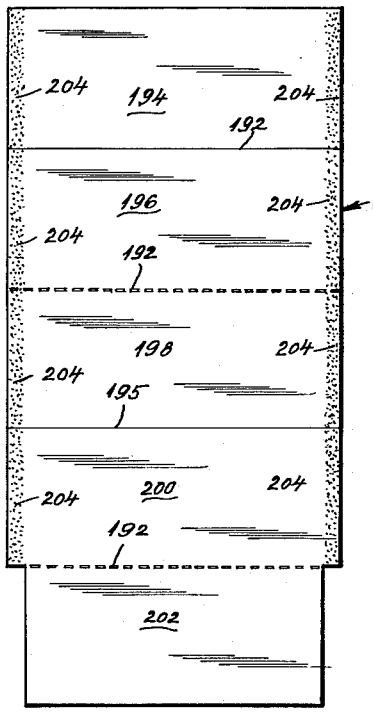
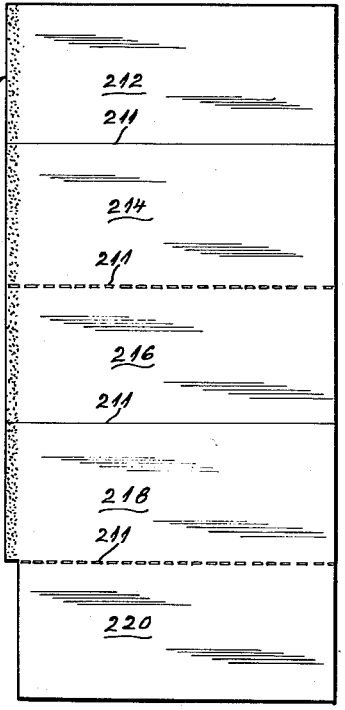

United States Patent Office 3,229,893
Patented Jan. 18, 1966

1

3,229,893
CONTINUOUS SELF-RETURNED MAILING
ENVELOPE
Myron Stein, 795 Garden St., Bronx, N.Y.
Filed Dec. 9, 1963, Ser. No. 329,159
1 Claim. (Cl. 229—68)

This invention relates generally to envelope constructions and more particularly to a combined forwarding and return envelope construction with enclosure.

A principal object of the invention is to provide a multiple folded sheet, certain folds of which are secured together constituting a forwarding envelope and certain folds of which are adapted to be secured together constituting a return envelope, the return envelope folds being detachable and carrying a detachable enclosure.

Another object of the invention is to provide a mailing piece with an integral detachable return envelope with enclosure which may be mailed to an addressee and returned to the sender.

A further object of the invention is to provide an envelope construction of this type that is simple in construction and economical to manufacture.

Broadly, according to one form, the invention consists of an elongated sheet of which is divided by spaced fold lines into a pair of adjacent panels constituting a forwarding envelope, into a pair of adjacent detachable panels constituting a return envelope and into a single panel constituting a detachable enclosure. The side margins of the envelope panels are coated with adhesive on the inner surfaces thereof so that if a respective pair of envelope panels are folded with their inner faces abutting the panels form an envelope.

Another object, according to a modification of the invention, is to provide a return envelope structure which is intended to form one leaf of a pamphlet or magazine such as the usual periodical, such envelope, for example, being used by the subscriber or purchaser in mailing his subscription or the subscription of others, to the publisher, or in corresponding relative to the subject matter printed on the envelope.

Another object of the invention is to provide a complete envelope which may be bound into a periodical or pamphlet by the same fasteners forming one of the leaves of the pamphlet.

Yet another object of the invention is to provide a pamphlet which incorporates therein a complete envelope, which is removable from the pamphlet without injury to the envelope or pamphlet and which does not require any forming operation before the envelope is completed and ready for use. The pamphlet may also incorporate integral with the complete envelope but separable therefrom for enclosure within the envelope a blank which may be removed from the pamphlet, either together with or separately from the envelope, to form an enclosure for the envelope.

For further comprehension of the invention, and of the objects and advantages thereof, reference will be had to the following description and accompanying drawings and to the appended claim in which the various novel features of the invention are more particularly set forth.

In the accompanying drawings forming a material part of this disclosure:

FIG. 1 is a front elevational view of a combined forwarding and return envelope construction embodying one form of the invention, with indicia thereon.

FIG. 2 is a plan view of the blank from which the envelope construction is made, adhesive being shown on

2 the margins of the envelope panels, and indicia being shown thereon.

FIG. 3 is a perspective view of the blank partly folded.

FIG. 4 is a vertical sectional view taken on the plane of the line 4—4 of FIG. 1, on an enlarged scale.

FIG. 5 is a horizontal sectional view taken on the plane of the line 5—5 of FIG. 1, on an enlarged scale, parts being shown broken away.

FIG. 6 is a view similar to FIG. 1 of the return envelope structure, with indicia thereon.

FIG. 7 is a plan view of the return envelope structure of FIG. 6 opened flatwise.

FIG. 8 is a vertical sectional view taken on the plane of the line 8—8 of FIG. 6, on an enlarged scale.

FIG. 9 is a front elevational view of an envelope construction embodying a modified form of the invention, indicia being shown thereon.

FIG. 10 is a plan view of the blank from which the envelope construction of FIG. 9 is made, adhesive being shown on the margins and indicia being shown thereon.

FIG. 11 is an enlarged vertical sectional view taken on the line 11—11 of FIG. 9.

FIG. 12 is a perspective view of a return envelope structure with enclosure incorporated in a pamphlet, constituting a modification of the invention.

FIG. 13 is a perspective view of the return envelope with enclosure detached from the pamphlet and partly folded.

FIG. 14 is a perspective view of the return envelope of FIG. 13 in folded condition.

Figure 15:
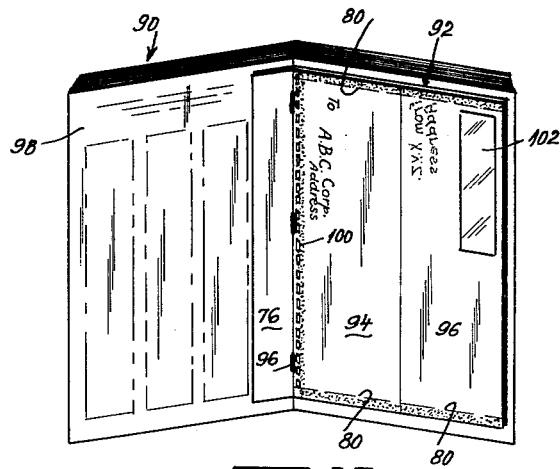

FIG. 15 is a view similar to FIG. 12 of a return envelope with enclosure incorporated in a pamphlet, constituting a further modification of the invention, indicia being shown thereon.

Figure 16:
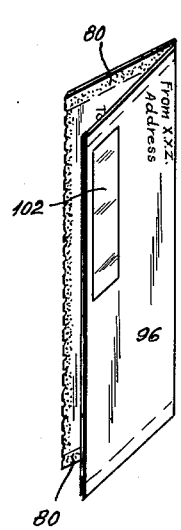

FIG. 16 is a perspective view of the return envelope of FIG. 15 detached from the pamphlet and partly folded.

Figure 17:
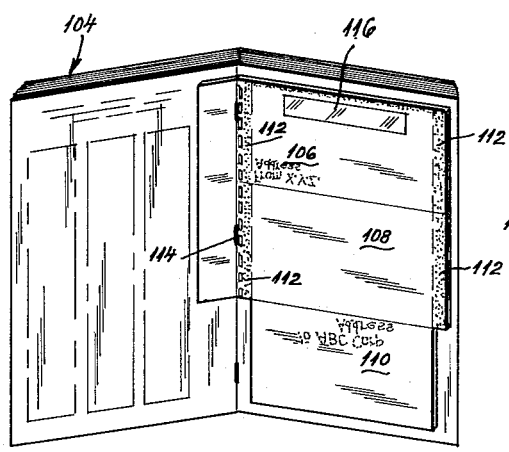

FIG. 17 is a view similar to FIG. 12 of a return envelope with enclosure incorporated in a pamphlet, constituting yet a further modification of the invention.

Figure 18:
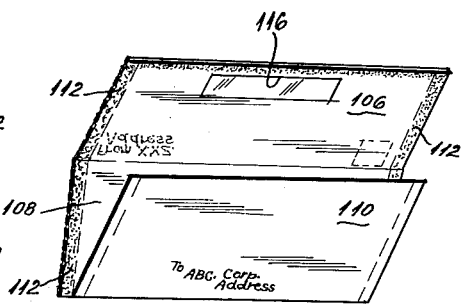

FIG. 18 is a perspective view of the return envelope of FIG. 17 detached from the pamphlet and partly folded.

Figure 19:
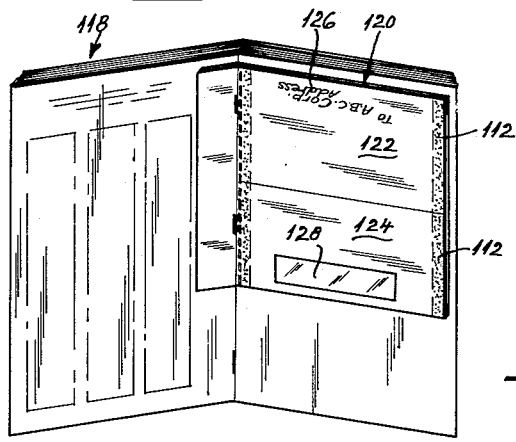

FIG. 19 is a view similar to FIG. 12 of a return envelope with enclosure incorporated in a pamphlet, constituting a still further modification of the invention, indicia being shown thereon.

Figure 20:
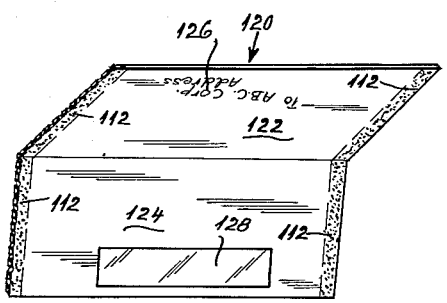

FIG. 20 is an enlarged perspective view of the return envelope of FIG. 19 detached from the pamphlet and partly folded.

FIGS. 21 to 24, inclusive, are plan views of blanks for further various modified forms of combined forwarding and return envelope constructions with enclosures.

Referring now in detail to the drawings, in FIG. 1 a combined forwarding and return envelope construction with enclosure is shown and designated generally by the reference numeral 10. The envelope construction was made from the blank 12 shown in FIG. 2 which consists of a single elongated sheet of paper divided by a fold line 14 into a pair of adjacent panels 16 and 18 at one end thereof, the top end as viewed in FIG. 2, by a fold line 20 into another pair of adjacent panels 22 and 24 below the first pair of panels and separated therefrom by a tear line 26. The panels 22 and 24 are narrower than the panels 16 and 18. A tear line 28 defines another panel 30 at the other end of the sheet. Panel 30 is narrower than the panels 22 and 24. The margins of the panels 16 and 18 are provided with matching strips of cohesive but inadhesive material 32 on the inner surface of the panels as shown in FIG. 2, and the margins of the panels 22 and 24 are provided with strips of cohesive but inadhesive material 34 on the inner surfaces thereof.

A horizontally arranged rectangular-shaped opening 36 is cut out of panel 16 centrally thereof at the top free long edge thereof as viewed in FIG. 2. The opening is closed by a strip of transparent plastic material forming a window 38. A vertically arranged rectangular-shaped box 40 is also defined by a line 42 at the lower right-hand corner of panel 16 as viewed in FIG. 2. Another vertically arranged rectangular-shaped box 44 is defined by a line 46 at the lower right-hand corner of panel 24 as viewed in FIG. 2. The panel 30 bears printed indicia 48 thereon on the inner surface thereof at the center thereof, for example, the word "Proxy." The outer surface of the panel 30 bears indicia 50, for example, the name and address of the addressee.

In use, the sheet is folded as shown in FIG. 3 with the panels 22 and 24 folded upon themselves and upon panel 18 and with panel 30 folded inwardly against panel 24. Panel 16 is finally folded down over the folded panels 18, 22, 24 and 30 to the condition of FIG. 1 wherein the window 38 is at the bottom center of panel 16 over the indicia 50 on the panel 30, to wit, the name and address of the addressee, and the box 40 is at the top right-hand corner thereof. By folding the panels in this manner, the coated margins 32 of the panels 16 and 18 contact each other and upon pressure thereon secure the side margins of the panels 16 and 18 to each other, holding the panels 22, 24 and 30 against unfolding and in concealed condition as shown in FIG. 1. Other indicia 52 may be placed on the face of the panel 16, for example, the name and address of the sender, at the top left-hand corner. Box 40 provides a guide for attaching postage.

The present invention utilizes the type of cohesive but inadhesive material as indicated at 32 and 34 commonly found in so-called "self-sealing" envelopes, which is a latex material well known in the envelope art under the term "dry sealing adhesive." The principal characteristic of the material is that two strips of it when brought into juxtaposition will stick to one another with great tenacity, but neither will stick to any other object. Accordingly, if a piece of paper is inserted between two strips of such material, the interfolded sheet may be handled like an ordinary folded sheet of paper.

Upon receipt of the envelope construction shown in FIG. 1, the addressee may, following instructions which may appear on a suitable space on the envelope construction, if he desides to sign and return the Proxy, tear the envelope construction along the tear line 26, thereby detaching panels 22, 24 and 30. When these panels are thus detached, the panel 30 bearing the word "Proxy" may be signed, or whatever is necessary, by the addressee, the panel next turned inwardly over panel 24 as shown in FIG. 7 and then panel 22 turned over the superposed panels 24 and 30, and its side margins pressed against the protruding side margins of panel 24 thereby securing said panels 22 and 24 together holding panel 30 against unfolding and concealing said panel 30 as shown in FIG. 6. When panel 22 is so folded the box 44 thereon is positioned at the top right-hand corner serving as a guide for attaching postage. The outer surface of folded panel 22 serves to receive indicia 54 such as name and address of the now addressee, the original sender, and serves to receive indicia 56 such as the name and address of the now sender, originally the addressee.

It will be noted that the panel 30, constituting in this instance a proxy, assumed its folded condition without being touched by the cohesive substance on the margins of the envelope panels 16, 18, 22 and 24, and that when the margins of panels 22 and 24 were secured together by the cohesive substance, to form the return envelope, the panel 30 assumed its folded condition without being touched by the substance on the margins of the panels so that the proxy is received by the original sender in fresh condition, ready to be torn off of the panel 24 for the intended purpose.

In the modified form of envelope construction 10' shown in FIGS. 9 to 11, inclusive, the envelope construction is similar to the envelope construction 10 of FIG. 1 except that no return envelope is provided so that the panel 30', constituting the proxy and bearing the word "Proxy" is attached directly to the envelope panel 18' by the tear line 26'. Panel 30' is narrower than panel 18'. In this form of the invention, the panel 30', constituting the proxy, must be detached, signed and returned in a separate envelope prepared by the party returning the proxy.

Referring now to the modification of the invention shown in FIGS. 12 to 14, inclusive, herein there is shown a pamphlet 60 in which the several sheets 62 thereof are secured together by staples 64 extending centrally through the entire group of sheets. The staples 64 which secure the sheets 62 also secure a complete envelope structure 66 within the pamphlet, with the structure 66 forming one of the sheets of the pamphlet. The structure 66 embodies a complete envelope in unfolded flatwise condition which is separable from the portion of the structure which is secured within the pamphlet, as will hereinafter appear. The envelope structure 66 comprises a rectangular-shaped sheet including two rectangular panels 68 and 70 joined by a fold line 72, the panels extending lengthwise of the pamphlet or vertically as viewed in FIG. 12. Another panel 74 extends laterally of the inner panel 68 which panel is shorter than the panels 68 and 70. Panel 74 is secured by the staples 64 centrally of the pamphlet to the other sheets thereof, and is provided with an extension 76 on the other side of the center of the pamphlet. A perforated tear line 78 is formed along the panel 74 parallel to and adjacent the staples 64.

The protruding top and bottom margins of the panels 68 and 70 are provided with strips of cohesive but inadhesive material 80 on the inner surface thereof. Panel 70 is formed with a cut-out portion midway its ends along its free long edge and this cut-out portion is filled with a strip of transparent plastic material forming a window 82. A rectangular box 84 defined by a line is formed in the panel 70 at the lower left-hand corner thereof as viewed in FIG. 12, serving as a guide for attaching postage.

In this type of pamphlet 60, the envelope structure 66 is held in position by the staples 64 in such a manner that any printing on the complete envelope, or on an enclosure sheet integral therewith, can be read while the pamphlet is held in its open position. At the same time, the complete envelope is separable from the pamphlet without mutilating either the pamphlet or the envelope.

In use, the complete envelope structure 66 is removed from the pamphlet 60 by tearing along the line of perforations 78. A message may be printed on the surface of the panel 74 as well as indicia 81 including the name and address of the addressee, or enclosures may be inserted within the completed envelope, after which the envelope is sealed by folding the panel 70 from its position of FIGS. 12 and 13 to its position of FIG. 14 where it overlies the panels 68 and 74, and wherein the margins of panels 68 and 70 are secured together by the cohesive material 80.

The pamphlet 90 with return envelope 92 shown in FIGS. 15 and 16 differs from the pamphlet of FIGS. 12 to 14 in that only two panels 94 and 96 are included instead of three, the long edge of panel 94 being secured by the staples 96 to the center of the pamphlet sheets 98. Said long edge of panel 94 is formed with the perforated tear line 100. In this form, the window 102 in panel 96 is adjacent the upper right-hand corner as viewed in FIG. 15.

In all other respects, pamphlet 90 and envelope 92 are similar to pamphlet 60 and envelope 66 and similar reference numerals are used to indicate similar parts.

In the modified pamphlet 104 shown in FIGS. 17 and 18, the envelope panels 106 and 108 and 110 are arranged transversely of the pamphlet 104 instead of longitudinally thereof, with the cohesive material 112 on the short edges thereof and with the inner short edges of the panels 106 and 108 secured to the sheets of the pamphlet by the staples 114. Panel 106 is formed with a window 116 and panel 110 bears indicia 116 including the name and address of the addressee which appears in window 116 when the panels are folded. This panel 110 may also contain messages or the like, and when the panels are folded, panel 110 is held against unfolding and in concealed condition similar to envelope 10' of FIGS. 9 and 10.

The modified form of pamphlet 118 with return envelope 120 shown in FIGS. 19 and 20 merely differs from the pamphlet 104 of FIG. 17 in that the third panel 110 of pamphlet 104 is omitted and only two panels 122 and 124 are included. In this form, panel 122 bears the indicia 126 such as the name and address of the addressee, and panel 124 contains the window 128.

Figure 21:
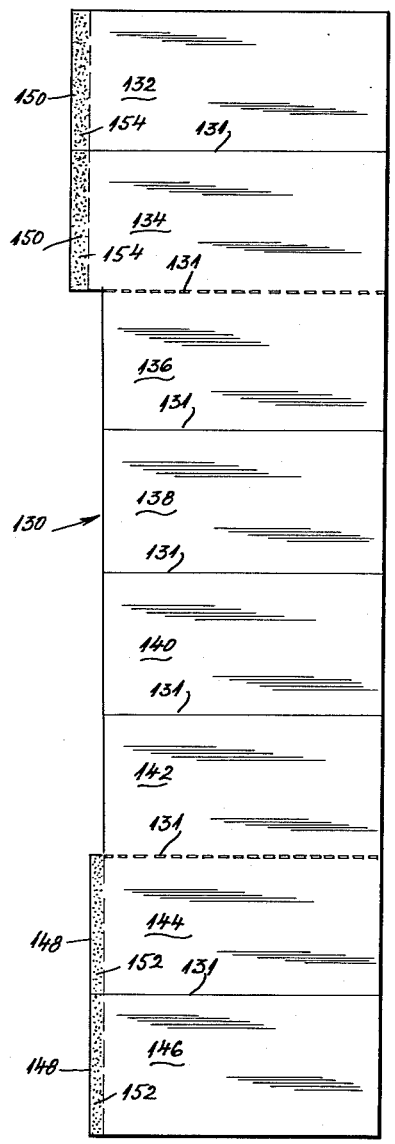

In FIG. 21, a blank 130 for making another modified form of combined forwarding and return envelope construction with enclosure is shown. The blank is divided by fold lines 131 into eight (8) panels, namely, end panels 132 and 134 at the top, intermediate panels 136, 138, 140 and 142, and end panels 144 and 146 at the bottom as viewed in FIG. 21. End panels 144 and 146 are wider than the intermediate panels being provided with laterally extending flanges 148 along one side thereof. End panels 132 and 134 are wider than the end panels 144 and 146 being provided with laterally extending flanges 150 along one side thereof. The flanges 148 are coated with a cohesive substance 152, and the flanges 150 by a similar substance 154. The fold line 131 between panels 134 and 136 is perforated to permit separation of said panels, and the fold line 131 between panels 142 and 144 is similarly perforated to permit separation thereof.

In assembling the blank 130 to form an envelope construction, the panels are folded along the fold lines 131, with the intermediate panels and panel 144 disposed between panels 134 and 146 and with panel 132 superimposed thereover. The flanged margins of panels 132 and 134 are pressed together to form the outer forwarding envelope.

Upon receipt by the addressee, the intermediate panels are torn off of panel 134 and used to convey messages or the like and refolded between panels 144 and 146 which may then be pressed together along the flanged margins thereof to form a return envelope. The name and address of the addressee and the name and address of the sender may be printed on the outside face of the panel 132 and the panel 146.

Figure 22:
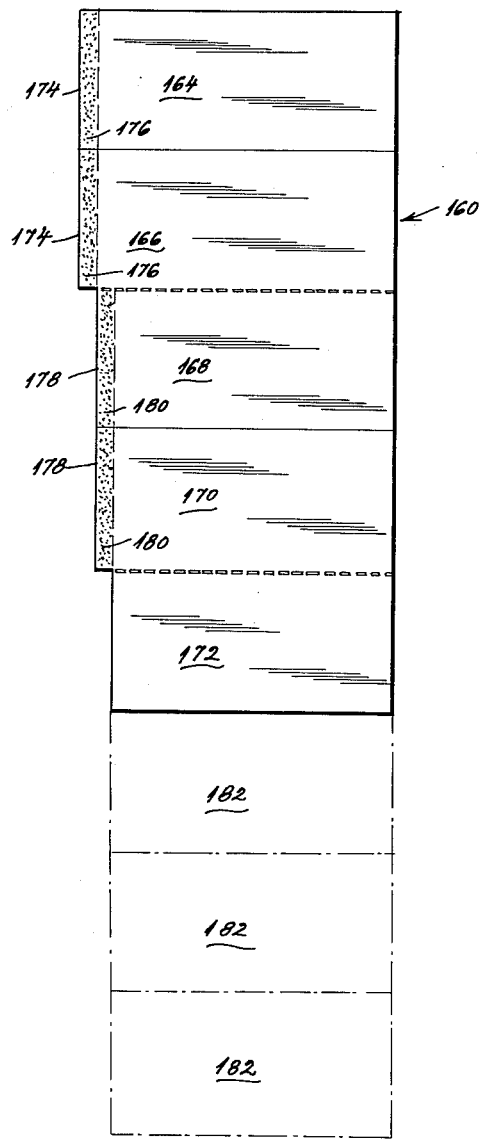

FIG. 22 illustrates a blank 160 for making yet another modified form of combined forwarding and return envelope construction with enclosure. The blank is divided by fold lines 162 into five (5) panels, namely, panels 164, 166, 168, 170, 172. The fold lines 162 between panels 166 and 168 and between panels 170 and 172 are perforated. At one side, panels 164 and 166 are formed with flanges 174, 174 coated with a cohesive substance 176, the flanges 174, 174 extending outwardly of similar flanges 178, 178 formed on the same side of panel 166. Flanges 178, 178 are also coated with a cohesive substance 180.

In assembling the blank 160 to form an envelope construction, panels 168, 170 and 172 are folded in juxtaposition to panel 166 and panel 164 is then superposed over the juxtaposed panels and the flanges 174, 174 pressed together thereby securing panels 164 and 166 together along one end edge thereof, thereby forming an outer forwarding envelope.

Upon receipt by the addressee, the panels 166 and 168 are separated along the perforated fold line 162 and panel 171 may serve as an enclosure to contain messages or the like, folded back against panel 170 and then panel 168 superposed over panels 170 and 172 and its coated flange 178 pressed against the flange 178 of panel 170 form a return envelope.

Additional foldable panels 182 may be added to panel 172 if desired as shown in dot-dash lines in FIG. 22.

The name and address of the addressee and the name and address of the sender may be placed on the outer face of panels 164 and 170.

A blank 190 for making yet a further modified form of combined forwarding and return envelope with enclosure is also shown in FIG. 23. The blank is divided by fold lines 192 into five (5) panels, namely, panels 194, 196, 198, 200, 202. The fold line 192 between panels 196 and 198 is perforated, and the fold line 192 between panels 200 and 202 is also perforated to permit separation of said panels. The margins on both sides of panels 194, 196, 198 and 200 are coated with cohesive substance 204, said panels serving as envelope panels and panel 202 serving as an enclosure containing messages or the like.

In assembling, panel 202 is folded back against panel 200 and panel 200 folded back against panel 198, and the juxtaposed panels 198, 200 and 202 folded back against panel 196 and then panel 194 is folded over the juxtaposed panels and its coated margins pressed against the coated margins of the outermost panel.

The name and address of the addressee and of the sender may be placed on the outer faces of both panels 194 and 200.

FIG. 24 illustrates a final blank 210 for making still a further modified form of combined forwarding and return envelope construction with enclosure. The blank is divided by fold lines 211 into five (5) panels, namely, panels 212, 214, 216, 218, 220. The fold lines 211 between panels 212 and 214 and between 218 and 220 are perforated. Panels 212, 214, 216 and 218 serve as envelope panels and panel 220 as an enclosure for messages and the like. The envelope panels are wider than the enclosure panel and on the laterally extending side are coated with a cohesive substance as indicated at 222.

The blank 210 is assembled similar to blank 190 of FIG. 23, only one end of the forwarding envelope being closed and with one end of the return envelope being closed.

Although FIG. 24 illustrates five panels, this arrangement may include any number of panels such as four, six, seven, etc. number of panels.

From the foregoing, it is apparent that by the present invention there is provided a pamphlet, magazine or other printed matter, one sheet of which provides a complete envelope initially forming a portion of the pamphlet, but readily removable therefrom, without mutilating either the pamphlet or the envelope. Furthermore, the envelope structure is so bound in the pamphlet that portions of the complete envelope may be provided with printed matter that is readable upon opening the pamphlet in the usual manner.

It is to be understood the window openings are optional and they may be omitted if desired; also that any type of adhesive may be provided along the full length or part of the length of the margins which are to be sealed. These marginal portions may be separated by suitable marginal perforations.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

The combination with a pamphlet comprising a plurality of sheets and staples for holding said sheets together, of an envelope secured within said pamphlet, the envelope forming one of the sheets of the pamphlet, said envelope comprising a pair of adjacent elongated rectangular-shaped panels, with a fold line therebetween, another elongated panel extending from said pair of panels, said other panel being engaged by said staples, said other panel having a perforated line extending adjacent to said staples and parallel thereto for ready removal of the envelope from the pamphlet, said other panel being shorter than the pair of adjacent panels, and matching strips of cohesive but inadhesive substance along the end margins of said pair of adjacent panels, so that engagement of said matching strips is adapted to form said pair of adjacent panels into a completed envelope, concealing said other panel, one of said panels having space along one of its long edges for an address, the other of said panels having a window positioned over said space.

References Cited by the Examiner

UNITED STATES PATENTS

| | | | |
|---|---|---|---|
| 1,256,145 | 2/1918 | Loewenbach | 229—92.3 |
| 2,128,275 | 8/1938 | Vogel | 229—92.7 |
| 2,165,195 | 7/1939 | Sawdon. | |
| 2,302,455 | 11/1942 | Mattson | 229—92.3 |
| 2,984,403 | 5/1961 | David | 229—73 |
| 3,159,329 | 12/1964 | Hiersteiner | 229—68 |

FOREIGN PATENTS

| | | |
|---|---|---|
| 17,078 | 1899 | Great Britain. |
| 122,132 | 1/1919 | Great Britain. |

JOSEPH R. LECLAIR, *Primary Examiner.*

GEORGE O. RALSTON, FRANKLIN T. GARRETT,
*Examiners.*